United States Patent

Harr

(10) Patent No.: US 7,140,764 B2
(45) Date of Patent: Nov. 28, 2006

(54) THERMAL TYMPANIC THERMOMETER TIP

(75) Inventor: James Harr, Foristell, MO (US)

(73) Assignee: Sherwood Services AG (CH)

( * ) Notice: Subject to any disclaimer, the term of this patent is extended or adjusted under 35 U.S.C. 154(b) by 0 days.

(21) Appl. No.: 11/123,902

(22) Filed: May 6, 2005

(65) Prior Publication Data

US 2005/0254549 A1 Nov. 17, 2005

Related U.S. Application Data

(62) Division of application No. 10/480,428, filed as application No. PCT/US03/11606 on Apr. 15, 2003.

(60) Provisional application No. 60/432,904, filed on Dec. 12, 2002.

(51) Int. Cl.
G01K 7/02 (2006.01)
G01K 1/16 (2006.01)
G01J 5/12 (2006.01)
A61B 5/01 (2006.01)

(52) U.S. Cl. ............ 374/121; 374/208; 374/132; 600/474; 600/549

(58) Field of Classification Search ........ 374/120–121, 374/132–133, 163–165, 179, 183, 208, 29, 374/137; 600/474, 549; 702/139
See application file for complete search history.

(56) References Cited

U.S. PATENT DOCUMENTS

| 3,491,596 A * | 1/1970 | Dean ............ 374/178 |
| 4,722,612 A | 2/1988 | Junkert et al. |
| 5,018,872 A | 5/1991 | Suszynski et al. |
| 5,159,936 A * | 11/1992 | Yelderman et al. ......... 600/549 |
| 5,626,139 A | 5/1997 | Szeles et al. |
| 5,645,349 A | 7/1997 | Fraden |
| 5,874,736 A | 2/1999 | Pompei |
| 6,241,384 B1 | 6/2001 | Pompei et al. |
| 6,292,685 B1 * | 9/2001 | Pompei ............ 600/474 |
| 6,435,711 B1 * | 8/2002 | Gerlitz ............ 374/130 |
| 6,694,174 B1 * | 2/2004 | Kraus et al. ......... 600/474 |
| 2002/0176478 A1 | 11/2002 | Tabata |
| 2002/0176479 A1 * | 11/2002 | Hur et al. ............ 374/131 |
| 2003/0067958 A1 | 4/2003 | Jang |
| 2004/0047392 A1 | 3/2004 | Wu et al. |
| 2004/0228386 A1 | 11/2004 | Tabata et al. |
| 2004/0233968 A1 | 11/2004 | Tabata et al. |
| 2005/0018749 A1 | 1/2005 | Sato et al. |
| 2005/0083991 A1 | 4/2005 | Wong |
| 2005/0085733 A1 | 4/2005 | Wong |
| 2006/0098709 A1 * | 5/2006 | Huang et al. ............ 374/121 |
| 2006/0153278 A1 * | 7/2006 | Chen et al. ............ 374/208 |

FOREIGN PATENT DOCUMENTS

EP 1 239 271 9/2002
WO WO 02/073144 7/2001

* cited by examiner

Primary Examiner—Gail Verbitsky

(57) ABSTRACT

A method for reducing temperature measurement error in a tympanic thermometer. The present disclosure provides a tympanic thermometer including a heat sensing probe defining a longitudinal axis and an outer surface extending from a distal end of the tympanic thermometer. The heat sensing probe includes a thermally insulating sensor housing extending to a distal end thereof. Can-packaged temperature sensing electronics are mounted at the distal portion of the sensor housing. A thermally conductive nozzle is configured to direct heat flux to the temperature sensing electronics in the distal end of the heat sensing probe. The sensor can preferably include a lip extending radially therefrom and contacting the nozzle at at least one contact point to provide heat flux to the sensor can.

2 Claims, 9 Drawing Sheets

THERMAL TYMPANIC THERMOMETER TIP

CROSS REFERENCE TO RELATED APPLCIATION

The present application is a divisional of patent application Ser. No. 10/480,428, filed on Dec. 10, 2003, which is a 371 of PCT/US03/11606, filed on Apr. 15, 2003, which claims benefit of U.S. Provisional Patent Application No. 60/432,904, filed on Dec. 12, 2002, which are hereby incorporated by reference.

BACKGROUND

1. Technical Field

The present disclosure generally relates to the field of biomedical thermometers, and more particularly, to a tympanic thermometer that includes a sensor having a nozzle disposed therewith that improves accuracy of temperature measurement.

2. Description of the Related Art

Medical thermometers are typically employed to facilitate the prevention, diagnosis and treatment of diseases, body ailments, etc. for humans and other animals, as is known. Doctors, nurses, parents, care providers, etc. utilize thermometers to measure a subject's body temperature for detecting a fever, monitoring the subject's body temperature, etc. An accurate reading of a subject's body temperature is required for effective use and should be taken from the internal or core temperature of a subject's body. Several thermometer devices are known for measuring a subject's body temperature, such as, for example, glass, electronic, ear (tympanic).

Glass thermometers, however, are very slow in making measurements, typically requiring several minutes to determine body temperature. This can result in discomfort to the subject, and may be very troublesome when taking the temperature of a small child or an invalid. Further, glass thermometers are susceptible to error and are typically accurate only to within a degree.

Electronic thermometers minimize measurement time and improve accuracy over glass thermometers. Electronic thermometers, however, still require approximately thirty (30) seconds before an accurate reading can be taken and may cause discomfort in placement as the device must be inserted into the subject's mouth, rectum or axilla.

Tympanic thermometers are generally considered by the medical community to be superior for taking a subject's temperature. Tympanic thermometers provide rapid and accurate readings of core temperature, overcoming the disadvantages associated with other types of thermometers. Tympanic thermometers measure temperature by sensing infrared emissions from the tympanic membrane (eardrum) in the external ear canal. The temperature of the tympanic membrane accurately represents the body's core temperature. Further, measuring temperature in this manner only requires a few seconds.

Known tympanic thermometers typically include a probe containing a heat sensor such as a thermopile, a pyroelectric heat sensor, etc. During use, the heat sensor is generally located outside the eardrum and utilizes a waveguide of radiant heat to transfer heat energy from the eardrum to the sensor. See, for example, U.S. Pat. Nos. 6,179,785, 6,186,959, and 5,820,264. These types of heat sensors are particularly sensitive to the eardrum's radiant heat energy.

In operation, a tympanic thermometer is prepared for use and a probe cover is mounted onto a sensing probe extending from a distal portion of the thermometer. The probe covers are hygienic to provide a sanitary barrier and are disposable after use. A practitioner or other care provider inserts a portion of the probe having the probe cover mounted thereon within a subject's outer ear canal to sense the infrared emissions from the tympanic membrane. The infrared light emitted from the tympanic membrane passes through a window of the probe cover and is directed to the sensing probe by a waveguide. The window is typically a transparent portion of the probe cover and has a wavelength in the far infrared range. The probe cover should provide for the easy and comfortable insertion of the probe into the ear canal.

The practitioner presses a button or similar device to cause the thermometer to take a temperature measurement. The microelectronics process electrical signals provided by the heat sensor to determine eardrum temperature and render a temperature measurement in a few seconds or less. The probe is removed from the ear canal and the probe cover is removed and discarded.

Many tympanic thermometers measure radiation being emitted from an object, such as the tympanic membrane, by employing a thermopile sensor. A membrane inside the thermopile sensor absorbs incoming radiation, which raises the temperature of the membrane. The hot junctions of thermocouples, which may be very small, are placed onto the membrane while the cold junction is thermally connected to a sensor body of the thermopile sensor. The thermocouples output a voltage change that is proportional to the temperature change between the hot and cold junctions of the thermocouple. This voltage change can be correlated to the Stefan-Boltzmann law for emitted radiation from a black body (represented in formulaic, $V_{out}=K(eT^4_{obj}-T^4_{sens})$.

Errors in temperature readings taken by known tympanic thermometers often occur because the temperature of the sensor body is changing due to changing ambient temperature situations. These changing ambient temperature situations include other factors that affect the temperature of the thermopile sensor. For example, when a tympanic thermometer at room temperature is placed in the human ear, heat transfers to the thermopile sensor and other portions of the tympanic thermometer. The thermopile sensor includes sensor optics and a sensor can. The sensor optics and can temperature are caused to increase very rapidly and thus emit radiation back to the membrane inside the thermopile sensor. Since the temperature of the sensor is measured back at the proximal end of the thermopile sensor, Tsens will not reflect the actual temperature of the thermopile sensor and therefore an error will be introduced to the temperature measurement.

Transferring some known tympanic thermometers from a room temperature setting to a different temperature setting in the human ear is a changing ambient environment. In these types of changing ambient environments, data from thermal analysis and lab testing has shown temperature changes across the thermopile sensor can range as high as 1.5–2.5 degrees Celsius using known nozzle configurations that are disposed with the sensors of these tympanic thermometers. Devices of this kind may disadvantageously take inaccurate temperature readings resulting in drawbacks for treating and diagnosing patients.

Therefore, it would be desirable to overcome the disadvantages and drawbacks of the prior art with a tympanic thermometer that includes a sensor having a nozzle disposed therewith that improves accuracy of temperature measurement. It is contemplated that the tympanic thermometer and its constituent parts are easily and efficiently manufactured and assembled.

SUMMARY

Accordingly, a tympanic thermometer is provided that includes a sensor having a nozzle disposed therewith that improves accuracy of temperature measurement to overcome the disadvantages and drawbacks of the prior art. The tympanic thermometer is easily and efficiently manufactured and assembled. The present disclosure resolves related disadvantages and drawbacks experienced in the art.

The present disclosure relates to a nozzle design that minimizes temperature reading errors and inaccuracy experienced in the prior art due to changing ambient environment temperatures. Thus, a tympanic thermometer is provided, in accordance with the principles of the present disclosure, having a nozzle configuration that directs heat flux to a proximal end of a sensor. Directing the thermally conducted heat to the proximal end of the sensor allows a sensed temperature (Tsens) to rise quickly with the sensor housing temperature rise due to ambient environment change. This configuration advantageously minimizes the associated changes in temperature ($\Delta T$) across the sensor can and the associated errors involved.

The present disclosure of the nozzle design minimizes temperature reading error in all ambient changing environments and facilitates a more stable design in its application. The nozzle configuration disclosed provides a geometry whereby the temperature changes ($\Delta T$) decrease to 0.2–0.4 degrees Celsius. This results provide for significant reductions in error.

The present disclosure provides a tympanic thermometer including a heat sensing probe defining a longitudinal axis and an outer surface extending from a distal end of the tympanic thermometer. The heat sensing probe includes a sensor housing extending to a distal end thereof. A sensor can is mounted with the sensor housing and a nozzle is mounted onto the sensor housing. The sensor can includes temperature sensing electronics for sensing temperature via the heat sensing probe. The nozzle includes a base disposed with the sensor housing and an elongated cylindrical nose portion disposed about the sensor housing. The nozzle is configured to direct heat flux to the distal end of the heat sensing probe. A probe cover is mountable to the distal end of the tympanic thermometer. The probe cover has an inner surface configured to engage an outer surface of the nozzle. The sensor can preferably include a lip extending radially therefrom and contacting the nozzle at at least one contact point to provide heat flux to the sensor can.

In an alternate embodiment, the tympanic thermometer includes a thermometer body and a heat sensing probe extending from the thermometer body. The heat sensing probe includes an elongated thermally conductive nozzle having an inner surface defining a cavity and an elongated thermally insulating sensor housing disposed within the cavity. An air gap separates the sensor housing from the inner surface. A sensor can is mounted to a distal end of the sensor housing and contacts the inner surface of the nozzle.

The heat sensing probe preferably includes a base engaging the sensor housing and the nozzle to provide coaxial alignment therebetween. The base also preferably includes structure that attaches the sensing probe to the thermometer body such as snap features, sleeve features, provisions for ultrasonic welding or provisions for fasteners such as screws, rivets or the like.

The sensor can preferably includes at least one protrusion extending radially outward to provide a contact point between the inner surface of the nozzle and the can to thereby facilitate heat flow from the can to the nozzle. In another embodiment, the protrusion(s) can be electrically preheated to reduce the temperature gradient in the heat sensing probe.

The sensor can preferably incorporates an infrared transmissive window, a sensor base having a distal surface and an infrared sensor disposed on the distal surface. The infrared sensor is configured to receive infrared radiation through the infrared transmissive window. In another embodiment, the infrared sensor includes a thermistor. The disclosure provided allows the temperature differential between the can surface and the thermistor to remain substantially constant while ambient temperature changes over time. The constant temperature differential is provided by optimizing a heat conduction path between the ambient environment and the can surface.

A disposable probe cover is preferably disposed over the heat sensing probe wherein the probe cover includes an infrared transmissive film substantially enclosing a distal end of the probe cover and aligned with a distal opening of the nozzle.

The present disclosure provides a method for reducing temperature measurement error in a tympanic thermometer by providing a thermally conductive path between the external environment and a sensor can incorporating temperature sensing electronics in a heat sensing probe of the tympanic thermometer. The thermally conductive path may include an elongated thermally conductive nozzle contacting the sensor can. The sensor can may be preheated to a predetermined temperature to reduce temperature gradients across the heat sensing probe.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings wherein:

DETAILED DESCRIPTION OF EXEMPLARY EMBODIMENTS

The exemplary embodiments of the tympanic thermometer and methods of use disclosed are discussed in terms of medical thermometers for measuring body temperature, and more particularly, in terms of a tympanic thermometer that includes a sensor having a nozzle disposed therewith that improves accuracy of temperature measurement. It is envisioned that the present disclosure finds application for the prevention, diagnosis and treatment of diseases, body ailments, etc. of a subject. It is further envisioned that the principles relating to the tympanic thermometer disclosed include proper removal of a used probe cover via the ejection apparatus and indication to a practitioner whether a new, unused probe is mounted to the tympanic thermometer.

In the discussion that follows, the term "proximal" will refer to the portion of a structure that is closer to a practitioner, while the term "distal" will refer to the portion that is further from the practitioner. As used herein, the term "subject" refers to a human patient or other animal having its body temperature measured. According to the present disclosure, the term "practitioner" refers to a doctor, nurse, parent or other care provider utilizing a tympanic thermometer to measure a subject's body temperature, and may include support personnel.

Figure 1:
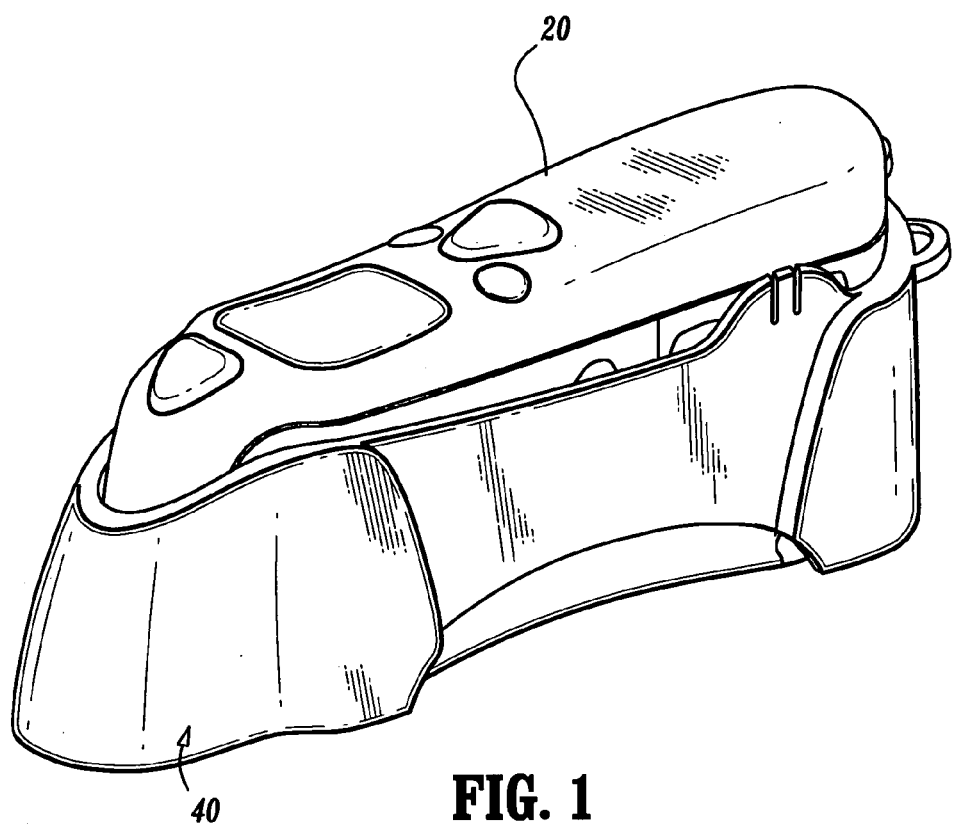
FIG. 1 is a perspective view of a tympanic thermometer, in accordance with the principles of the present disclosure, mounted with a holder.
Figure 2:
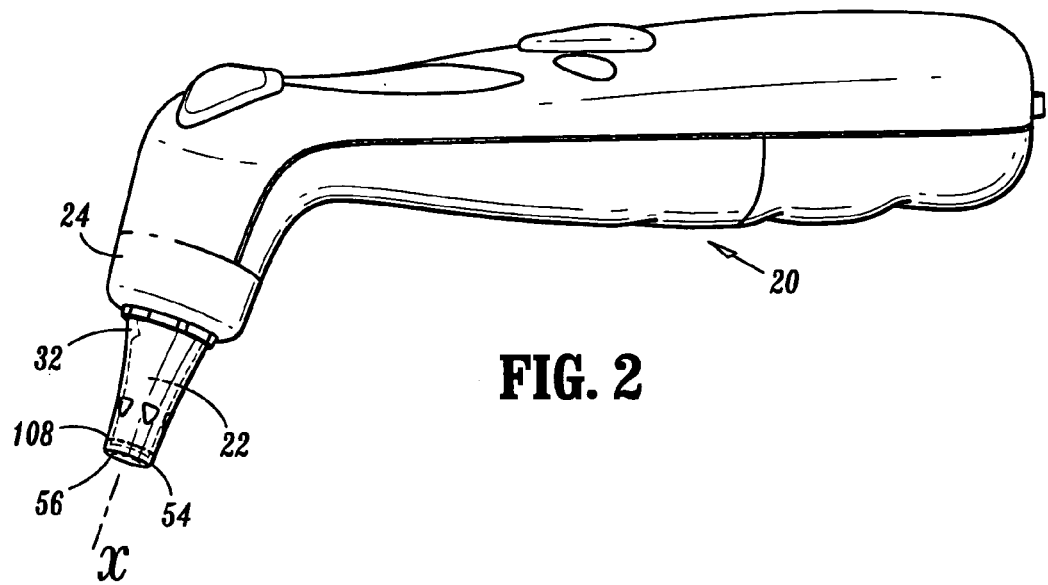
FIG. 2 is a perspective view of the tympanic thermometer shown in FIG. 1.

Reference will now be made in detail to the exemplary embodiments of the present disclosure, which are illustrated in the accompanying figures. Turning now to the figures wherein like components are designated by like reference numerals throughout the several views and initially to FIGS. 1, 2 and the attached disclosure, plots, graphs and figures, there is illustrated a tympanic thermometer 20, in accordance with the principles of the present disclosure.

Tympanic thermometer 20 includes a cylindrical heat sensing probe 22. Heat sensing probe 22 extends from a distal end 24 of tympanic thermometer 20 and defines a longitudinal axis x. Heat sensing probe 22 may have various geometric cross-sectional configurations, such as, for example, rectangular, elliptical, etc. A probe cover 32 is mounted to distal end 24. Probe cover 32 may be shaped, for example, frustoconically, or shaped in a tapered manner as to allow for easier insertion into the ear of the subject and attachment and detachment from the heat sensing probe 22. Heat sensing probe 22 is configured to detect infrared energy emitted by the tympanic membrane of the subject.

It is contemplated that tympanic thermometer 20 includes the necessary electronics and/or processing components to perform temperature measurement via the tympanic membrane, as is known to one skilled in the art. It is further envisioned that tympanic thermometer 20 may include a waveguide to facilitate sensing of the tympanic membrane heat energy. Tympanic thermometer 20 is releasably mounted in a holder 40 for storage in contemplation for use. Tympanic thermometer 20 and holder 40 may be fabricated from semi-rigid, rigid plastic and/or metal materials suitable for temperature measurement and related use. It is envisioned that holder 40 may include the electronics necessary to facilitate powering of tympanic thermometer 20, including, for example, battery charging capability, etc.

Figure 3:
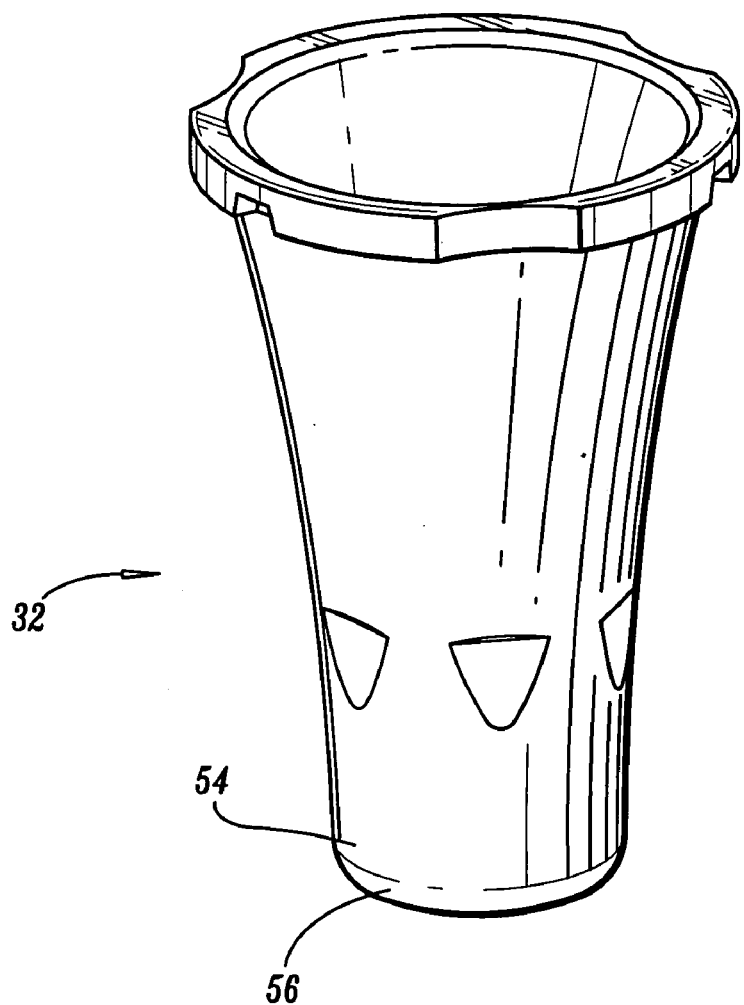
FIG. 3 is a perspective view of a probe cover intended for mounting to the tympanic thermometer shown in FIG. 2.

Referring to FIG. 3, probe cover 32 has a distal end 54 that is substantially enclosed by a film 56. Film 56 is substantially transparent to infrared radiation and configured to facilitate sensing of infrared emissions by heat sensing probe 22. Film 56 is advantageously impervious to ear wax, moisture and bacteria to prevent disease propagation.

The component portions of the probe cover, which is disposable, are fabricated from materials suitable for measuring body temperature via the tympanic membrane with a tympanic thermometer measuring apparatus. These materials may include, for example, plastic materials, such as, for example, polypropylene, polyethylene, etc., depending on the particular temperature measurement application and/or preference of a practitioner. The probe cover has a window portion or film that can be fabricated from a material substantially transparent to infrared radiation and impervious to moisture, ear wax, bacteria, etc. The film has a thickness in the range of 0.0005 to 0.001 inches, although other ranges are contemplated. The film may be semi-rigid or flexible, and can be monolithically formed with the remaining portion of the probe cover or integrally connected thereto via, for example, thermal welding, etc. One skilled in the art, however, will realize that other materials and fabrication methods suitable for assembly and manufacture, in accordance with the present disclosure, also would be appropriate.

Figure 4:
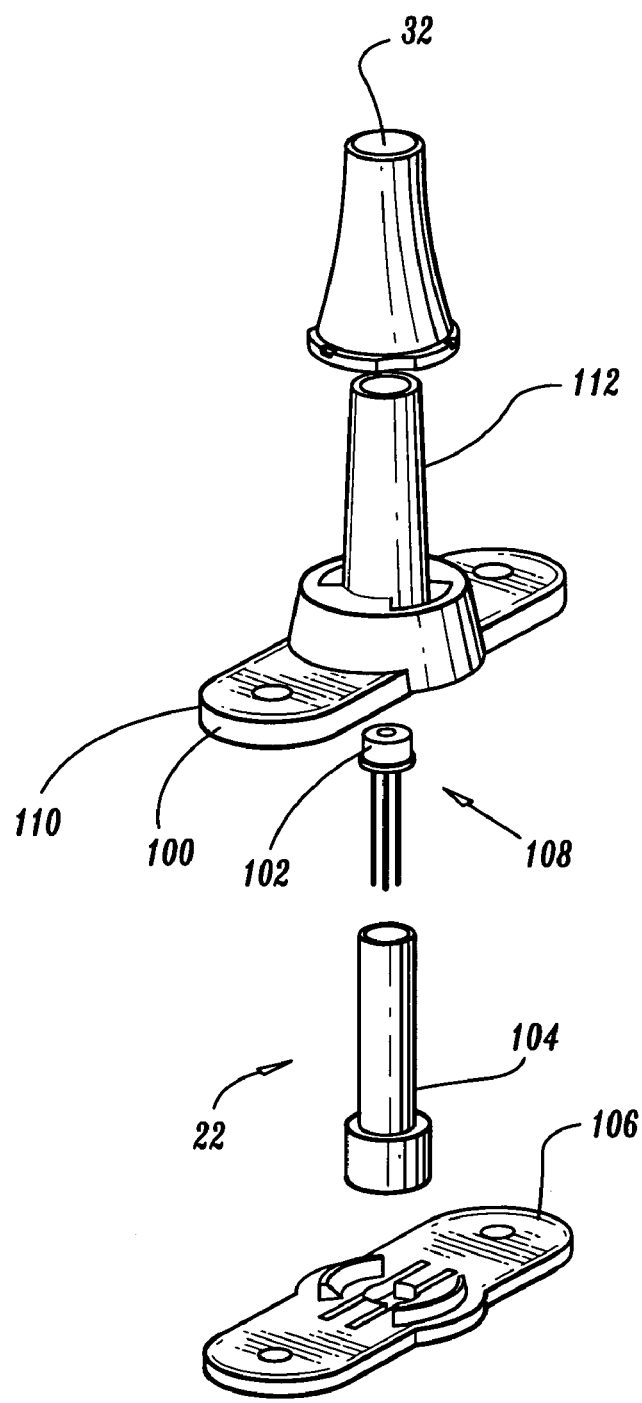
FIG. 4 is an exploded view, with parts separated, of a distal end of the tympanic thermometer shown in FIG. 2.
Figure 4A:
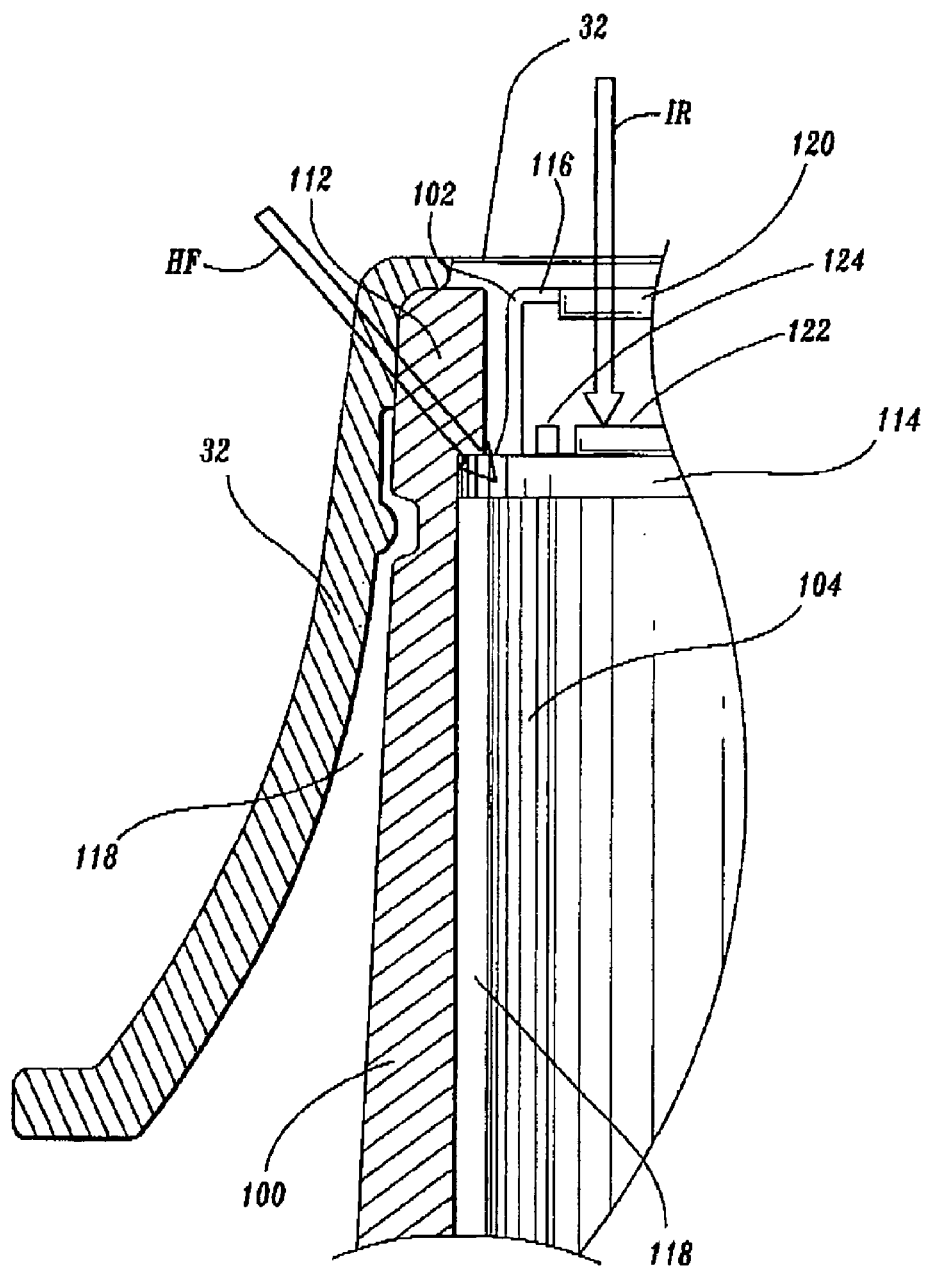
FIG. 4A is a partial cross-sectional view of the probe cover mounted on the distal end of the tympanic thermometer shown in FIG. 2.
Figure 5:
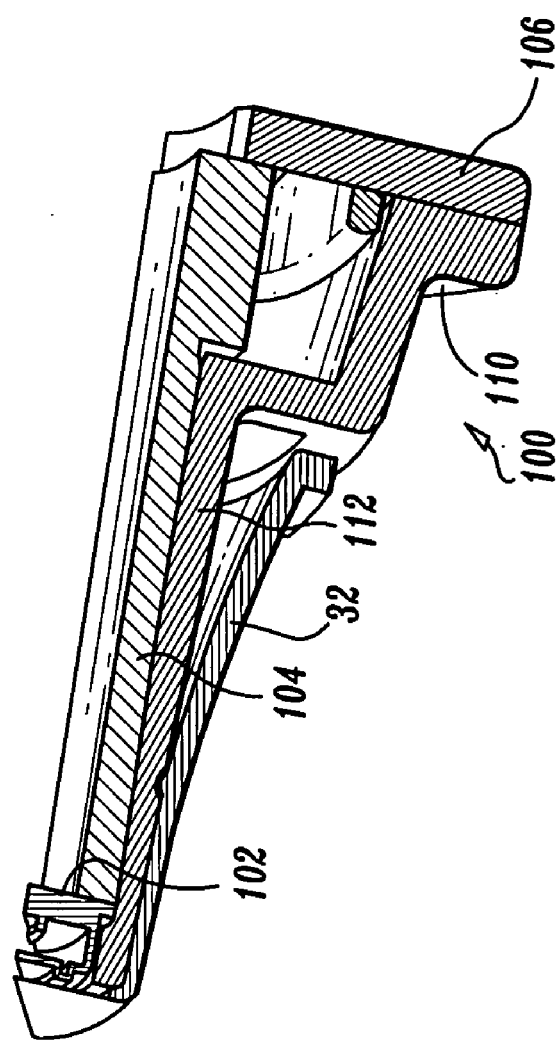
FIG. 5 is an enlarged perspective cutaway view of the distal end of the tympanic thermometer shown in FIG. 2.

Referring to FIGS. 4, 4A and 5, heat sensing probe 22 includes a nozzle 100, a can 102 attached to temperature sensing electronics, a sensor housing 104 and a base 106. By way of non-limiting example, nozzle 100 may be fabricated from metal or other material which aides in the rapid exchange or transfer of heat. Similarly, by way of non-limiting example, sensor housing 104 is preferably fabricated from materials which provide for less thermo transmission (i.e., more insulated) than nozzle 100, for example, plastic or other similar matter. FIG. 4A discloses a partial cross section of the probe cover 32 as mounted onto nozzle 100 and an air gap 118 disposed therebetween. As shown, nozzle 100, sensor housing 104 and can 102 are fitted in a secure relationship. Such secure relationship may be established by way of adhesive, friction, press fitting and the like. An air gap 118 is disposed between the nozzle 100 and sensor housing 104. Can 102 further includes sensor base 126, infrared sensor 122, infrared filter or window 120 and thermistor 124.

The component parts of heat sensing probe 22 are assembled and nozzle 100 is mounted thereon to direct heat flux through a distally positioned sensor window at distal end 108 of heat sensing probe 22. Nozzle 100 includes a base 110 and an elongated nose portion 112 that facilitate transfer of the heat flux to distal end 108.

In operation, heat from, for example, the ear of the subject, is transferred from probe cover 32 to nozzle 100. It is contemplated herein that nozzle 100 may be both in physical contact with the lip 114 or in a close proximate relationship with lip 114 of can 102. Such contact enables heat transfer from nozzle 100 to lip 114 of can 102. As shown in FIGS. 6–9 and 11–12, heat transfer to can 102 from lip 114 can occur at any local or single point of contact (FIGS. 6–9 and 11–12 disclose such point of contact along an upper portion of lip 114) or along a plurality of contact points, for example, the entire portion of lip 114.

It is contemplated herein, that can 102 may have a plurality of lips, ribs or other similar structures, for example, detents, nubs, etc., which aide in the heat transfer from nozzle 100 to can 102 and ultimately to can tip 116. Lip members 114 may also be formed in a variety of geometric configurations, e.g., helical, dashed, etc. For example, in order to reduce the temperature gradient from the lip 114 to tip 116, (as well as the reduction of the temperature gradient from internal thermistor 124 (FIG. 4A) and top of can 102), can 102 may have a plurality of lip members made from a metal alloy or other material. Such lip members may be made from separate materials, may be partially in contact with the body of can 102, or otherwise be adapted to reduce the temperature gradient from lip area 114 to can tip 116.

It is also contemplated herein, that can 102 by way of or in addition to the lips 114 can be pre-heated electrically or by other means to certain preset temperatures. Lip members 114 assist in heat transfer from nozzle 100, such that the heat gradient from lip 114 to can tip 116 is reduced. This reduction in the gradient across the sensor tip of can 102 provides for faster, more accurate results.

As noted above, and as opposed to other prior art temperature sensing tips, which are designed to insulate sensing tips, the tympanic thermometer of the present disclosure heats the sensor tip (can 102) by way of heat transfer from lip 114 (which receives heat from nozzle 100) in order to reduce the temperature gradient across tip 116.

As discussed and shown in the FIGS. 4, 4A and 5 above, sensor can 102 is distally situated along the sensor housing 104 and nozzle 100. Such relationship provides for the sensor to be included within or substantially close to the ear of a subject during a temperature reading. The prior art disclose sensor to ear relationships of this kind; however, these prior art relationships include unique differential heating issues of the sensor. As discussed below and shown in FIGS. 6–12, the differential heating problems of the prior art have been overcome.

By way of a non-limiting example and referring to FIGS. 6–12, one embodiment of tympanic thermometer 20 includes heat sensing probe 22 at an initial temperature of 20° C. when a 40° C. temperature load is applied to the outside surface of probe cover 32. This is similar to taking heat sensing probe 22 from room temperature and disposing it within the ear of a human subject with a fever. As shown, radiation effects are applied to the top face of sensor housing 104 and nozzle 100. A transient analysis was run for ten (10) seconds for an aluminum nozzle design with a sensor contact.

Figure 6:
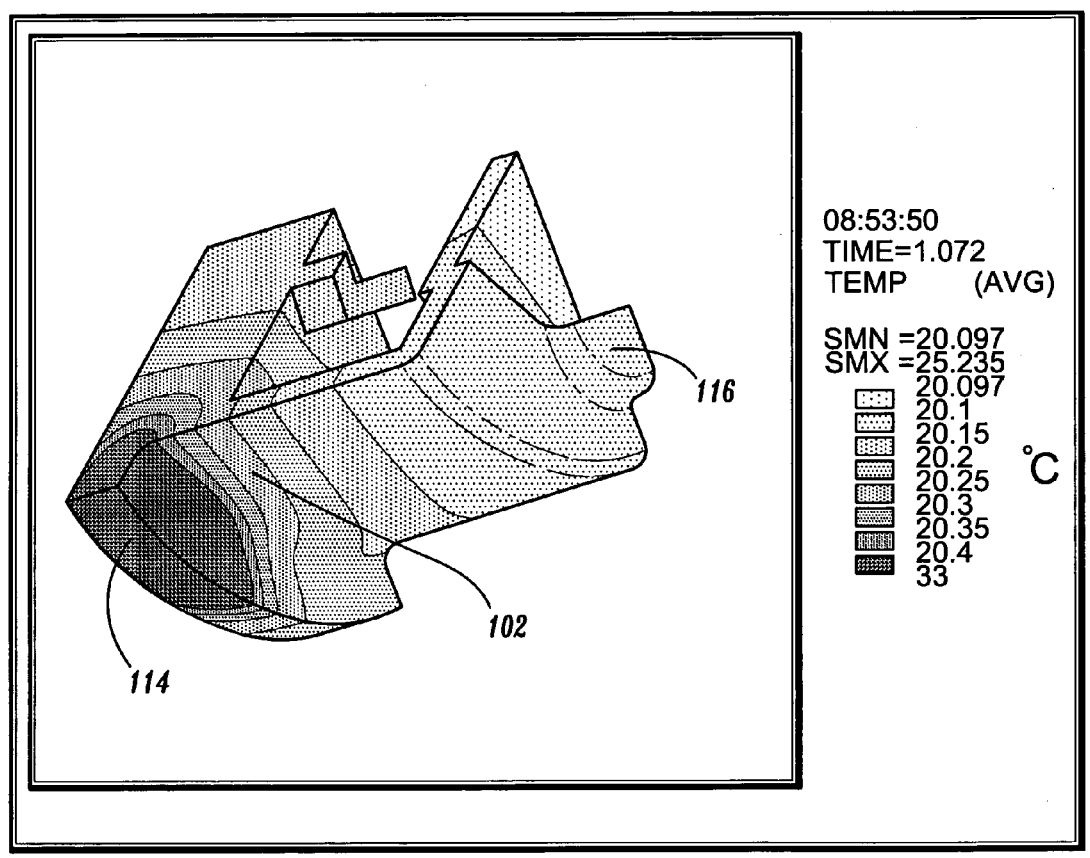
FIG. 6 is a temperature gradient plot for one embodiment of the tympanic thermometer, in accordance with the present disclosure measured at 1.072 seconds after heat has been applied.
Figure 7:
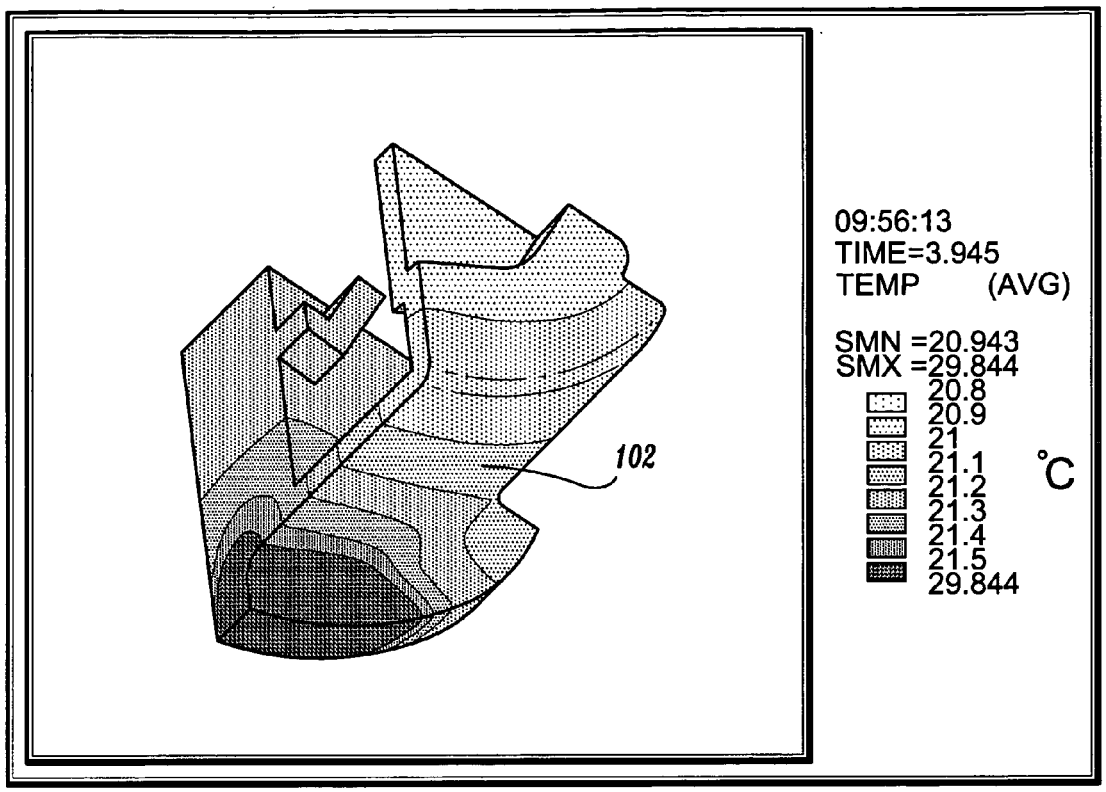
FIG. 7 is a temperature gradient plot for the embodiment of the tympanic thermometer shown in FIG. 6 measured at 3.945 seconds after heat has been applied.
Figure 8:
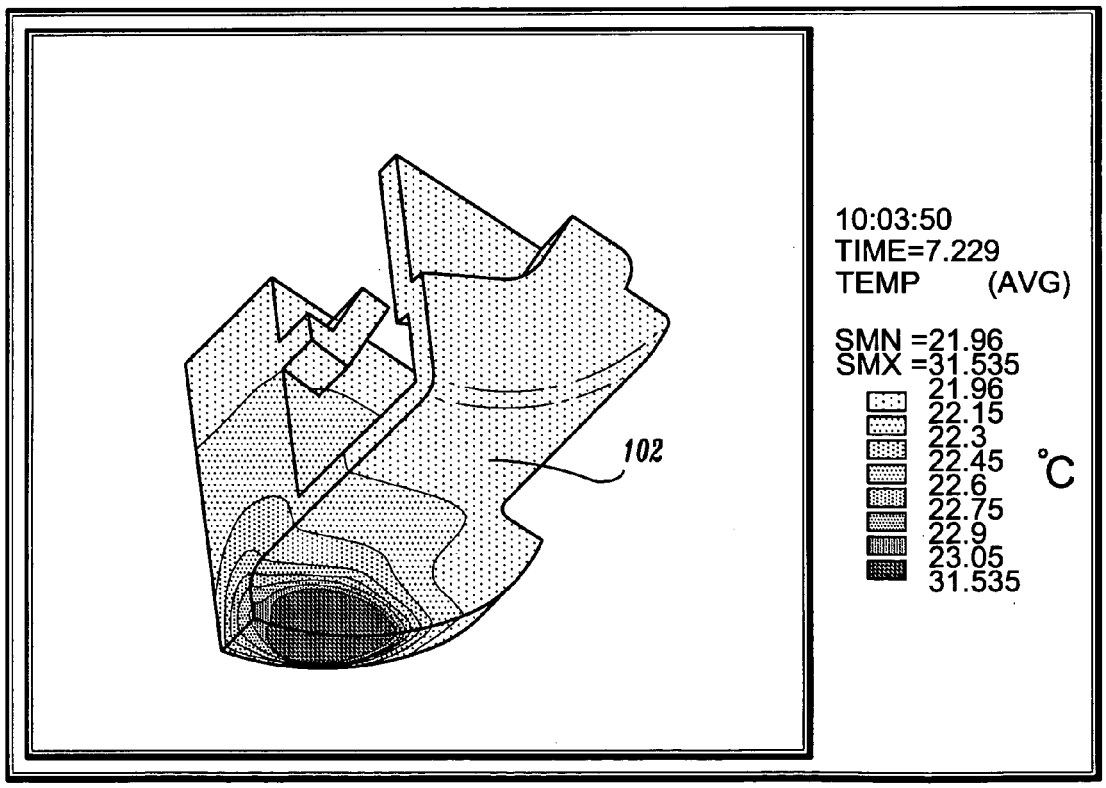
FIG. 8 is a temperature gradient plot for the embodiment of the tympanic thermometer shown in FIG. 6 measured at 7.229 seconds after heat has been applied.
Figure 9:
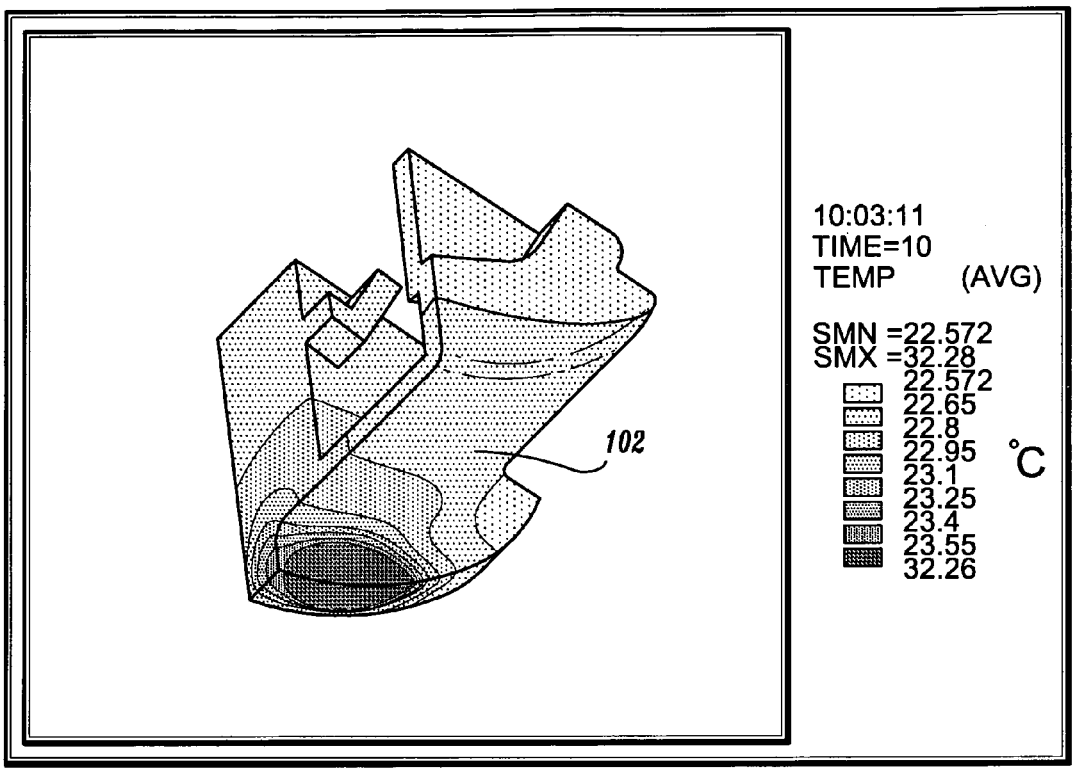
FIG. 9 is a temperature gradient plot for the embodiment of the tympanic thermometer shown in FIG. 6 measured at 10 seconds after heat has been applied.
Figure 10:
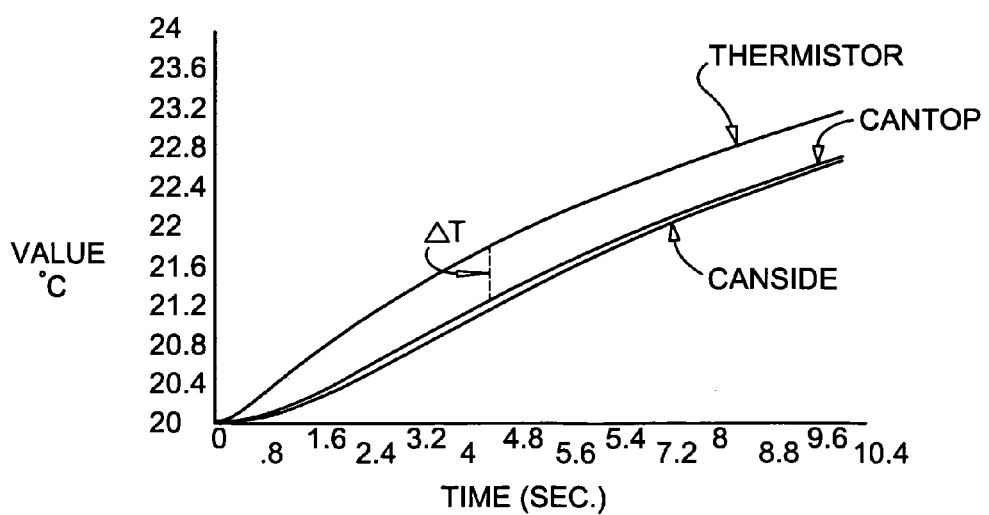
FIG. 10 is a time versus temp graph of locations of the sensor temperatures for the embodiment of the tympanic thermometer for the time periods shown in FIG. 6–9.
Figure 11:
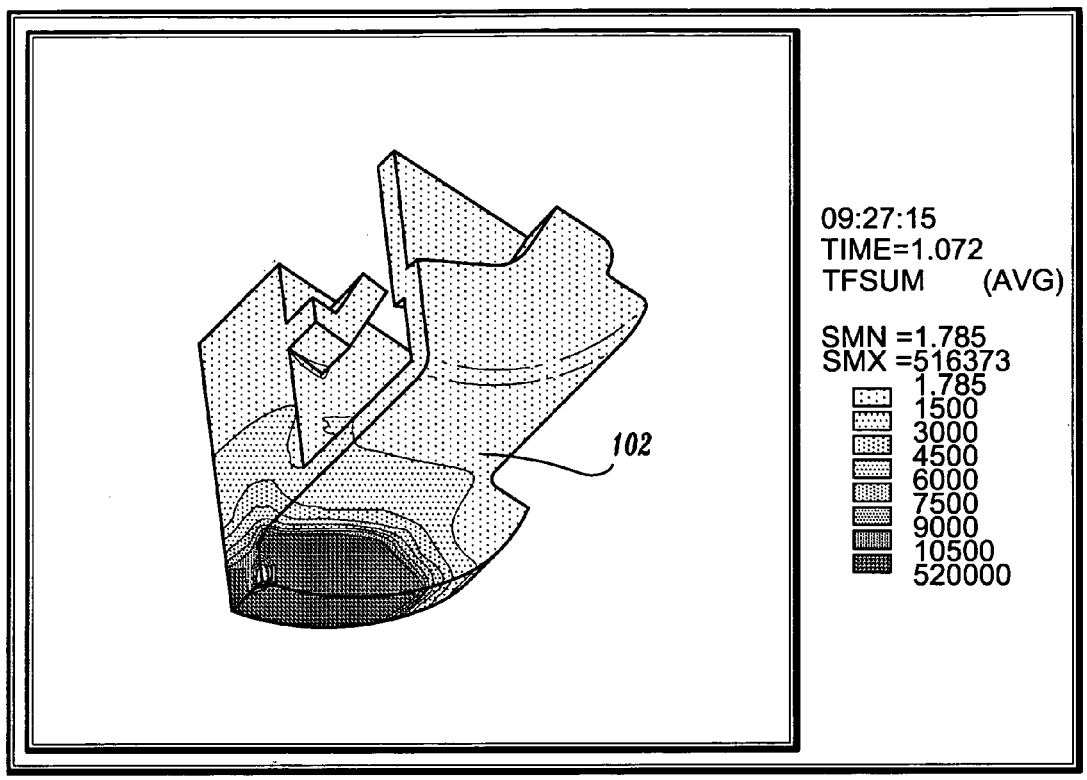
FIG. 11 is a temperature gradient plot for heat flux for the embodiment of the tympanic thermometer shown in FIG. 6 measured at 1.072 seconds after heat has been applied.
Figure 12:
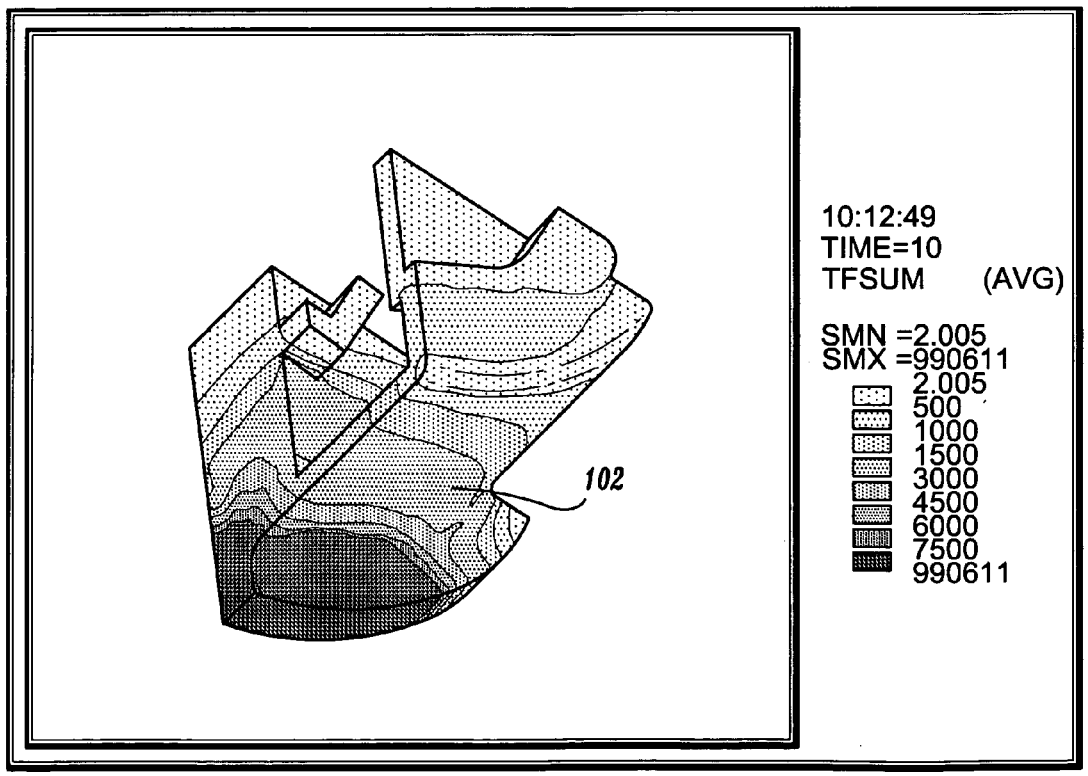
FIG. 12 is a temperature gradient plot for heat flux for the embodiment of the tympanic thermometer shown in FIG. 6 measured at 10 seconds after heat has been applied.

FIGS. 6–12 show temperature plots from a simulated temperature reading of the human ear. The data of such were confirmed from actual experimental tests performed on the ear of a subject. FIG. 6 shows a temperature plot of the temperature distribution across the sensor section of can 102 after 1.072 seconds. Areas of focus include the surface where the absorber chip and thermistor 124 (FIG. 4A) are located, the inside top of the sensor can and the inside side of the sensor can. FIG. 7 shows a temperature plot of the temperature distribution across the sensor section after 3.945 seconds. FIG. 8 shows a temperature plot of the temperature distribution across the sensor section after 7.229 seconds. FIG. 9 shows a temperature plot of the temperature distribution across the sensor section after 10 seconds. FIG. 10 shows a plotted graph of the temperature distribution for the 10 second time transient. As shown from the results of a nodal analysis performed at the top, side internal thermistor 124 (FIG. 4A) of can 102, ($\Delta T$) is substantially constant across the 10 second time transient (that is, ($\Delta T$) essentially tracks the thermistor 124 (FIG. 4A)). As such, temperature accuracy errors do not increase with time as in conventional prior art thermometers. Temperature readings can occur at substantially any time along the plotted graph of FIG. 10. FIG. 11 shows a temperature plot of the temperature gradient plot for heat flux after 1.072 seconds. FIG. 12 shows a temperature plot of the temperature gradient plot for heat flux after 10 seconds.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method of assembling a tympanic thermometer comprising:
   providing a heat sensing probe including a thermally insulating sensor housing; forming the sensor housing from a thermally insulating material;
   mounting a sensor can on the thermally insulating sensor housing, the sensor can including temperature sensing electronics for sensing temperature via the heat sensing probe;
   mounting a thermally conductive nozzle onto the thermally insulating sensor housing, said nozzle including a thermal conductive base and an elongated cylindrical nose portion; and
   configuring the nozzle, sensor can and housing to direct heat flux from the distal end of the sensor can to a proximal end of said sensor can and to reduce the temperature gradient from a can tip to a sensor base.

2. The method according to claim 1 further comprising contacting said thermally conductive nozzle at least one contact point with a lip extending radially from the sensor can to provide heat flux to said sensor can.

* * * * *